United States Patent [19]

Huther

[11] Patent Number: 4,612,146

[45] Date of Patent: Sep. 16, 1986

[54] PROCESS FOR THE HOT-ISOSTATIC COMPRESSION OF CERAMIC SHAPED PARTS

[75] Inventor: Werner Huther, Karlsfeld, Fed. Rep. of Germany

[73] Assignee: MTU Motoren- und Turbinen-Union Munchen GmbH, Munich, Fed. Rep. of Germany

[21] Appl. No.: 622,781

[22] Filed: Jun. 21, 1984

[30] Foreign Application Priority Data

Jun. 30, 1983 [DE] Fed. Rep. of Germany ....... 3323509

[51] Int. Cl.$^4$ .............................................. C01B 31/00
[52] U.S. Cl. .................................. 264/29.6; 264/29.1; 264/29.7; 264/62; 264/332

[58] Field of Search ............... 264/570, 62, 29.6, 29.7, 264/29.1, 332

[56] References Cited

U.S. PATENT DOCUMENTS 4,112,143 9/1978 Adlerborn .......................... 264/570

FOREIGN PATENT DOCUMENTS 58104708 6/1922 Fed. Rep. of Germany ...... 264/570

Primary Examiner—James Derrington
Attorney, Agent, or Firm—Roberts, Spiecens & Cohen

[57] ABSTRACT

A ceramic preform is coated with a layer of amorphous carbon and is then hot-isostatically compressed to form the desired ceramic part. The layer of carbon can then be removed.

13 Claims, No Drawings

PROCESS FOR THE HOT-ISOSTATIC COMPRESSION OF CERAMIC SHAPED PARTS

FIELD OF THE INVENTION

The invention relates to a process for forming shaped parts or moldings of ceramic material by hot-isostatic compression.

BACKGROUND AND PRIOR ART

Various processes for forming ceramic molded articles by hot-isostatic compression are known.

In one known method, a powder preform is injection molded or extruded cold-isostatically, thereafter provided with a gas-impervious coating, and then compressed hot-isostatically.

In another known process of manufacture, the prefabricated powder preform is sintered, the density remaining below about 95%, so that the sintered preform remains porous. The body is then provided with a gas-impervious coating and hot isostatically compressed.

In a third known method of manufacture a powder preform is sintered to a density of more than 95% so that it is no longer porous and it is then hot-isostatically compressed.

Glass is ordinarily used for the coating in the first two methods of manufacture.

In the prior art, it is difficult to remove the coating. Furthermore, there is the disadvantage that the temperature at which the hot-isostatic compression is carried out is limited to 1700° C. to 1850° C. due to the fact that the glass softens at higher temperatures. The powder preform contains sintering promoting additives which impair the high temperature strength of the body (for instance, MgO or $Y_2O_3$ in $Si_3N_4$) or the strength (for instance, B or Al or C in SiC) or the heat conductivity (for instance, B or Al or C in SiC). Sintering promoting additives are, in principle, necessary in order to permit the hot-isostatic compression at a temperature which is still withstood by the glass coating (in accordance with the first two known methods of manufacture) or in order to obtain the desired sintering (in accordance with the last two methods of manufacture). A minimal amount of sintering promoting additives is desirable in order to avoid the aforesaid disadvantages.

SUMMARY OF THE INVENTION

An object of the present invention is to provide a process for forming shaped parts or moldings of ceramic by hot-isostatic compression by which it is possible, with simple means, to form a gas impermeable coating on the prefabricated powder preform which can easily be removed or can remain on the molding and which softens only slightly at the temperature required for the compacting of the preform.

This object of the invention is achieved by producing a layer of amorphous carbon on the prefabricated ceramic preform, whereafter the part is hot-isostatically compressed.

DETAILED DESCRIPTION OF PREFERRED EMBODIMENTS

The invention contemplates the formation of a layer of amorphous carbon on a preform which is hot-isostatically compressed with the preform in the formation of a shaped body. The carbon layer can be removed from the shaped body by burning at a temperature of 600° to 1200° C. in air.

In order to produce the layer of amorphous carbon, the prefabricated ceramic preform is preferably coated one or more times with a phenol resin, epoxy resin or polyimide resin, for example, by brushing the resin on the preform or dipping the preform into a resin bath. The coated preform is cured by a heat treatment at a temperature of 150° to 250° C., and a carbonization of the resin is produced by a further heat treatment which consists of a slow heating of the preform in an inert gas or under vacuum at a temperature increment of about 10° C. per hour until carbonization takes place.

The purpose of the heat treatments is to form an impermeable or hermetic layer of amorphous carbon on the preform. If a hermetic layer is not formed by a single coating of resin, the preform is again coated with resin and the process repeated until a hermetic layer is formed. This generally need not be done more than one to three times.

The application of the resin can also be effected by eddy sintering, particularly in the case of epoxy and polyimide resins. A uniform layer is produced by eddy sintering.

The carbonization of the resin can be carried out faster under pressure in an inert gas such as argon or nitrogen. This is effected preferably in the first curing step; the further carbonization steps are carried out under vacuum as otherwise gas could become occluded below the resulting layer and prevent compacting by the hot-isostatic compression. Of course, if occlusion of gas is desired then the further carbonization steps can be carried out in the presence of the desired gas.

The preform can be as follows:

(a) Parts of reaction-bonded silicon nitride which contain 0.5 to 5% MgO or $Y_2O_3$;

(b) Powdered preforms of $Si_3N_4$ powder, consisting of $Si_3N_4$ powder of a particle size of $0.2\mu$ to $40\mu$. An average particle size of 1 to $2\mu$ is preferred with a maximum particle size of less than $10\mu$. The purity is 95 to 99.9% and preferably at least 99%. The powder preforms can be provided with a sintering promoting additive such as MgO or $Y_2O_3$ powder of a particle size equal to that of the $Si_3N_4$ powder. The sintering promoting additive is present in an amount of 0.1 to 5%. By the addition of the sintering promoting additive, the plastic properties of the molding can be controlled.

(c) Powdered preforms of silicon carbide. The particle size is as above and the purity is between 95% to 99.9%, preferably at least 98%. The silicon-carbide preform can be provided with additives which prevent grain growth, for instance 0.2 to 5% $Al_2O_3$, MgO, TiN, $Y_2O_3$ or TiC. The particle size of the additive is between 0.2 to $10\mu$ and the preferred average particle size is less than $1\mu$ with a maximum particle size of less than $10\mu$.

The reduction of the grain growth during hot-isostatic compression results in better mechanical properties such as strength.

The hot-isostatic compression is carried out at temperatures of 1700° C. to 2500° C. at pressures of 500 to 3000 bars. The duration of the treatment is between one-half hour to eight hours. For the hot-isostatic compression of $Si_3N_4$ preform parts it is advantageous to effect the carbonization of the resin for the production of the layer of amorphous carbon in a nitrogen atmosphere of 0.1 to 300 bars. The nitrogen will be trapped in the layer and prevent thermal dissociation of the Si$_3$N$_4$.

The powdered preforms are, as known per se, produced by injection molding or cold-isostatic compression and working in green state.

Thus, by the method of the invention a hermetic or impermeable layer is easily produced on the preform. The layer is sufficiently plastically deformable at the temperature at which the hot-isostatic compression takes place to be deformed with the preform. The layer penetrates only insignificantly into the ceramic body and can be removed, if desired, by burning off in air at 600° to 1200° C.

The invention will hereafter be described with reference to a specific example of a preferred embodiment thereof.

EXAMPLE

A preform part consisting of reaction-bonded silicon nitride which contains 2% MgO having a generally cylindrical shape of 3" diameter and 6" length was dipped into a phenol resin bath consisting of 45% modified Phenol-Resol resin of low viscosity dissolved in 55% of a mixture of ethyl alcohol and furfurol (trade name: fluidic phenol resin Tpy SL 444 manufactured by Bakelite GmbH) for 20 seconds at 20° C. A uniform coating of the resin of a thickness of 0.2 mm was formed on the preform part. An example suitable for a epoxy resin bath is a composition comprising 55% epoxy resin, 44.5% methyl nadic anhydrite, as a cure agent and 0.5% tertiary amine as an accelerator. An example of a polyimide resin bath is a composition comprising 60% polyimide resin, 20% dimethylacetate and 20% methylethylketones (all percentages in % by weight).

The thus coated part was heated to a temperature of 200° C. at 1 bar for 1 hour until the resin on the coated preform becomes hardened. Thereafter the coated part was subjected to a further treatment by continuing to heat the part at a temperature which was gradually increased 10° C. per hour in a vacuum until carbonization of the resin was effected and an amorphic carbon layer was formed on the part. Carbonization was completed after about 50 hours. In the event that carbonization is not achieved, the part is re-immersed into the resin bath and the process is repeated until the amorphic carbon layer is obtained.

The preform with the amorphic carbon layer thereon was then subjected to hot-isostatic compression at a temperature of 2000° C. and a pressure of 1500 bars to form the coated preform as a ceramic turbine hub.

The amorphic carbon layer was then removed from the ceramic body by burning layer off in air at a temperature of 900° C. for 10 minutes.

I claim:

1. A process for the manufacture of a shaped ceramic part comprising applying a resin coat on a preform of silicon nitride or silicon carbide, heating the resin coat to form a gas impermeable coating of amorphous carbon therefrom on said preform, hot-isostatically compressing the preform with the amorphous carbon coating thereon to form a shaped ceramic part with the amorphous carbon coating, and then burning off the amorphous carbon coating.

2. A process as claimed in claim 1 wherein the resin coat is formed by at least one coat of a phenol resin, epoxy resin or polyimide resin on the preform.

3. A process as claimed in claim 2 which further includes the step of curing the resin coat on the preform by heat treatment at 150° to 250° C.

4. A process as claimed in claim 1 wherein said heating comprises slow heating of the preform in an inert gas or vacuum.

5. A process as claimed in claim 2 wherein the heating is carried out after each application of a resin coating on the preform.

6. A process as claimed in claim 5 wherein the heating of the first resin layer is carried out under pressure and any subsequent heat treatment is carried out in a vacuum.

7. A process as claimed in claim 1 wherein the preform comprises reaction-bonded silicon nitride which contains 0.5 to 5% MgO or Y$_2$O$_3$.

8. A process as claimed in claim 1 wherein the preform comprises a powder preform of Si$_3$N$_4$ powder having an average particle size of 1 to 2$\mu$ and a purity of 99%.

9. A process as claimed in claim 8 wherein the powder preform comprises a sintering promoting additive of MgO or Y$_2$O$_3$ powder.

10. A process as claimed in claim 1 wherein said preform comprises a powder preform of silicon carbide having an average particle size of 1 to 2$\mu$ and a purity of 98%.

11. A process as claimed in claim 10 wherein the silicon carbide preform includes additives which prevent grain growth.

12. A process as claimed in claim 1 wherein the amorphous carbon coating is burned off the shaped part at a temperature of 600° to 1200° C. in air.

13. A process as claimed in claim 2 wherein the amorphous carbon coating is burned off the shaped part at a temperature of 600° to 1200° C. in air.

* * * * *